United States Patent
Dykstra

(10) Patent No.: US 7,394,832 B1
(45) Date of Patent: Jul. 1, 2008

(54) TECHNIQUE FOR SYNCHRONIZING REDUNDANT NETWORK ELEMENTS

(75) Inventor: John Dykstra, Shoreview, MN (US)

(73) Assignee: Nortel Networks Limited, St. Laurent, Quebec (CA)

(*) Notice: Subject to any disclaimer, the term of this patent is extended or adjusted under 35 U.S.C. 154(b) by 831 days.

(21) Appl. No.: 10/657,214

(22) Filed: Sep. 9, 2003

(51) Int. Cl.
*H04J 3/06* (2006.01)

(52) U.S. Cl. .................................... 370/509

(58) Field of Classification Search ........... 370/503, 370/509–516, 216, 217, 218, 219, 220, 242, 370/244, 252, 253
See application file for complete search history.

(56) References Cited

U.S. PATENT DOCUMENTS

| | | | | |
|---|---|---|---|---|
| 6,148,410 A | * | 11/2000 | Baskey et al. | 714/4 |
| 6,247,141 B1 | * | 6/2001 | Holmberg | 714/2 |
| 6,378,129 B1 | * | 4/2002 | Zetts | 725/94 |
| 2003/0058893 A1 | * | 3/2003 | Dworkin et al. | 370/503 |

* cited by examiner

*Primary Examiner*—Ricky Q. Ngo
*Assistant Examiner*—Pao Sinkantarakorn
(74) *Attorney, Agent, or Firm*—Hunton & Williams, LLP

(57) ABSTRACT

A technique for synchronizing redundant network elements is disclosed. In one particular exemplary embodiment, the technique may be realized as a method that comprises: transmitting a checkpoint indication signal to a primary element and at least one backup element, wherein each of the primary element and the at least one backup element has one or more connections to a network; generating a first checkpoint that is indicative of a first status of the primary element associated with a first arrival time of the checkpoint indication signal at the primary element; generating a second checkpoint that is indicative of a second status of the at least one backup element associated with a second arrival time of the checkpoint indication signal at the at least one backup element; and comparing the first checkpoint and the second checkpoint to determine a synchronization between the primary element and the backup element.

19 Claims, 5 Drawing Sheets

TECHNIQUE FOR SYNCHRONIZING REDUNDANT NETWORK ELEMENTS

FIELD OF THE INVENTION

The present invention relates generally to computer and communication networks and, more particularly, to a technique for synchronizing redundant network elements.

BACKGROUND OF THE INVENTION

In order to achieve high availability of network resources, it is often desirable to configure communication systems with redundant elements, running in synchronization with each other. These redundant network elements, also referred to as "mirrors", receive the same inputs from outside the system, perform the same processing, and are capable of generating the same outputs. However, typically only one of the mirrors (i.e., "the primary") has its outputs enabled, while the outputs of the other mirrors (i.e., "the backups") are suppressed. In the event of a failure of the primary, the outputs of one of the backups may be enabled so that the functions of the primary can be taken over without interruption of network services. This is referred to as a failover.

To ensure proper recovery from network failures of the primary, it is critical for the backups to remain synchronized with the primary. Therefore, it is necessary for the redundant elements to periodically exchange state information (referred to as "checkpoints") with the primary. This information may be used by each network element to verify that it is still in synchronization with the other elements, and to restore synchronization, if necessary.

Unfortunately, it takes time to create a checkpoint at the primary, transmit it to another element, and process that checkpoint at the destination node. During that time, the receiving node may have continued to receive system inputs and thus its state may no longer match the state recorded in the checkpoint. Reconciling these two states can be a difficult problem, requiring complex and error-prone programming.

Currently, a number of solutions exist for checkpoint synchronization. One obvious approach is to stop the system from accepting new inputs from the time a checkpoint is generated to the time it is processed by the other mirrors. Unfortunately, this solution negatively impacts system responsiveness and makes it vulnerable to new failure modes.

Another approach is to include in the checkpoint an index number that monotonically increases each time a mirror receives and processes new inputs. When a mirror receives a checkpoint, it compares the index number contained in the checkpoint with the current value of its local index number. If the mirror's local value is higher, it discards the checkpoint as obsolete. The primary shortcoming of this approach is that, in the common case where system inputs arrive continuously, most if not all of the checkpoints will have to be discarded.

One brute force solution is to program the checkpoint comparison such that state changes that occur at the receiving node subsequent to the generation of the checkpoint may be factored out and ignored. However, this approach requires extremely careful design and implementation and is susceptible to subtle bugs not detectable in testing. In addition, it may be impossible to implement on certain payload applications.

In view of the foregoing, it would be desirable to provide a solution for checkpoint synchronization which overcomes the above-described inadequacies and shortcomings. More particularly, it would be desirable to provide a technique for synchronizing redundant network elements in an efficient and cost effective manner.

SUMMARY OF THE INVENTION

According to the present invention, a technique for synchronizing redundant network elements is provided. In one particular exemplary embodiment, the technique may be realized as a method for synchronizing redundant network elements. The method comprises transmitting a checkpoint indication signal to a primary element and at least one backup element, wherein each of the primary element and the at least one backup element has one or more connections to a network. The method also comprises generating a first checkpoint that is indicative of a first status of the primary element associated with a first arrival time of the checkpoint indication signal at the primary element. The method further comprises generating a second checkpoint that is indicative of a second status of the at least one backup element associated with a second arrival time of the checkpoint indication signal at the at least one backup element. The method additionally comprises comparing the first checkpoint and the second checkpoint to determine a synchronization between the primary element and the backup element.

In accordance with one aspect of this particular exemplary embodiment, the checkpoint indication signal may be beneficially transmitted from the primary element, the at least one backup element or a source outside the network.

In accordance with another aspect of this particular exemplary embodiment, the step of generating a first checkpoint may further beneficially comprise identifying a first arrival time of the checkpoint indication signal at the primary element, finishing processing of any data arriving at the primary element before the first arrival time of the checkpoint indication signal, suspending processing of a plurality of data arriving at the primary element after the first arrival time of the checkpoint indication signal, generating a first checkpoint that is indicative of the status of the primary element in suspension, transmitting the first checkpoint to the at least one backup element, and resuming processing of the plurality of data arriving at the primary element after the first arrival time of the checkpoint indication signal.

In accordance with yet another aspect of this particular exemplary embodiment, the step of generating a second checkpoint may further beneficially comprise identifying a second arrival time of the checkpoint indication signal at the at least one backup element, finishing processing of any data arriving at the at least one backup element before the second arrival time of the checkpoint indication signal, suspending processing of a plurality of data arriving at the at least one backup element after the second arrival time of the checkpoint indication signal, and generating a second checkpoint that is indicative of the status of the at least one backup element in suspension. In accordance with this aspect, the method may further beneficially comprise keeping the at least one backup element in suspension after generation of the second checkpoint, comparing the second checkpoint with the transmitted first checkpoint, updating the at least one backup element based on the transmitted first checkpoint if the second checkpoint does not match the transmitted first checkpoint based on a predetermined set of criteria, and taking the at least one backup element out of suspension. Alternatively, the method may further beneficially comprise taking the at least one backup element out of suspension after generation of the second checkpoint, comparing the second checkpoint with the transmitted first checkpoint, and reporting an error if the second checkpoint does not match the transmitted first checkpoint based on a predetermined set of criteria.

In accordance with another exemplary embodiment, the technique may be realized as at least one signal embodied in at least one carrier wave for transmitting a computer program of instructions configured to be readable by at least one processor for instructing the at least one processor to execute a computer process for performing the method as recited above.

In accordance with yet another exemplary embodiment, the technique may be realized as at least one processor readable carrier for storing a computer program of instructions configured to be readable by at least one processor for instructing the at least one processor to execute a computer process for performing the method as recited above.

In accordance with still another exemplary embodiment, the technique may be realized as a system for synchronizing redundant network elements. The system comprises means for transmitting a checkpoint indication signal to a primary element and at least one backup element, wherein each of the primary element and the at least one backup element has one or more connections to a network. The system also comprises means for generating a first checkpoint that is indicative of a first status of the primary element associated with a first arrival time of the checkpoint indication signal at the primary element. The system further comprises means for generating a second checkpoint that is indicative of a second status of the at least one backup element associated with a second arrival time of the checkpoint indication signal at the at least one backup element. The system additionally comprises means for comparing the first checkpoint and the second checkpoint to determine a synchronization between the primary element and the backup element.

In accordance with a further exemplary embodiment, the technique may be realized as a method for synchronizing redundant network elements. The method comprises receiving at a backup element a checkpoint indication signal, generating a first checkpoint that is indicative of a status of the backup element associated with an arrival time of the checkpoint indication signal at the backup element, receiving a second checkpoint from a primary element, and comparing the first checkpoint and the second checkpoint to determine a synchronization between the primary element and the backup element.

In accordance with another exemplary embodiment, the technique may be realized as a system for synchronizing redundant network elements. The system comprises means for receiving at a backup element a checkpoint indication signal, means for generating a first checkpoint that is indicative of a status of the backup element associated with an arrival time of the checkpoint indication signal at the backup element, means for receiving a second checkpoint from a primary element, and means for comparing the first checkpoint and the second checkpoint to determine a synchronization between the primary element and the backup element.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

According to an embodiment of the present invention, a network may be configured to comprise a primary element and one or more backup elements. The primary element may be a computer, a server, or a content-aware switch/router having one or more connections to the network. In addition, the primary element may be running a payload application that receives input(s) on the one or more network connections, processes the input(s), and generates one or more outputs. The one or more backup elements may have substantially the same hardware and software configurations as the primary element. If running in synchronization, both the backup element(s) and the primary element may see the same inputs and make the same state transitions. However, only the primary element may have its output(s) enabled while the outputs of the backup element(s) may be suppressed during normal operation. Therefore the backup element(s) may be referred to as being redundant of the primary element. As used herein, a "redundant network element" refers to any one of the primary element and its redundant backup elements. For illustrative purpose, a scenario with only one primary element and one backup element will be described herein. It should be appreciated that the inventive concept set forth below is applicable to any number of redundant elements.

Figure 1:
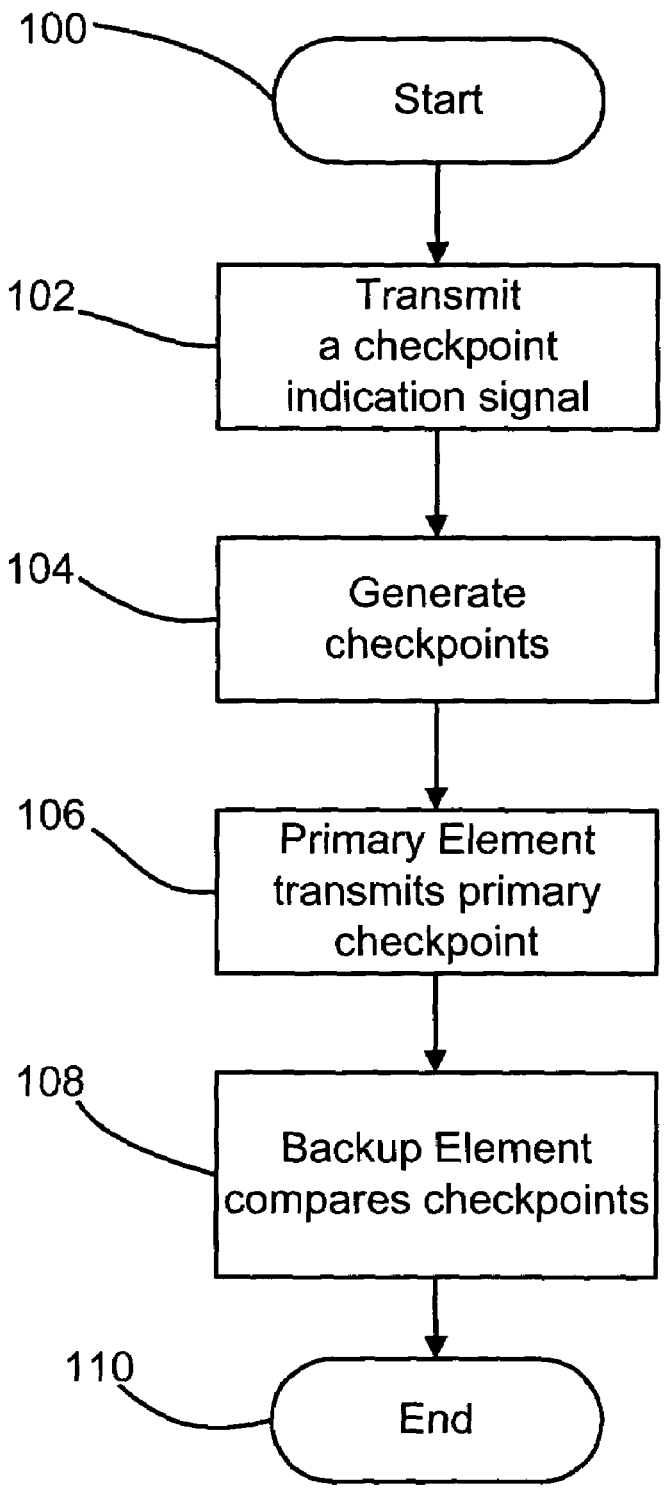
FIG. 1 is a flow chart illustrating an exemplary method for synchronizing redundant network elements in accordance with the present invention.

Referring to FIG. 1, there is shown a flow chart illustrating an exemplary method for synchronizing redundant network elements in accordance with the present invention.

The exemplary method starts at step 100.

At step 102, a checkpoint indication signal may be transmitted to the redundant elements in a network.

According to an embodiment of the present invention, the checkpoint indication signal may be generated from a source outside the network or by one of the redundant network elements. The checkpoint indication signal may be generated periodically to initiate a check of synchronization between the primary element and the backup element. Or the checkpoint indication signal may be generated upon triggering events. Other variations for the generation of checkpoint indication signals are also possible. The checkpoint indication signal may be a simple triggering signal or a signal packet containing extra information associated with the synchronization process. Regardless of the origin of the checkpoint indication signal, it may be desirable to transmit this signal over a switch fabric or an Ethernet such that the positioning of the signal relative to system input traffic is the same as seen by all the redundant network elements.

At step 104, checkpoints may be generated by the redundant network elements. That is, the primary element and the backup element may each generate its own checkpoint that is indicative of their respective status upon receiving the checkpoint indication signal. A detailed description of the checkpoint generation process will be provided below.

At step 106, the primary element may transmit its checkpoint ("primary checkpoint") to the backup element.

At step 108, the backup element may compare the primary checkpoint and the checkpoint generated at the backup element ("backup checkpoint"). If these two checkpoints do not match, it may be an indication that the backup element is out of synchronization with the primary element. Depending on the status of the backup element after it generates the backup checkpoint, different actions may be taken by the backup element after comparing the checkpoints. A detailed description of these actions will be provided below.

After the backup element compares the checkpoints and takes appropriate actions, the process ends at step 110.

According to an embodiment of the present invention, a checkpoint may also be transmitted to other backup element(s) if more than one backup elements exist. Therefore, the checkpoint comparison may take place at any of the redundant network elements.

Figure 2:
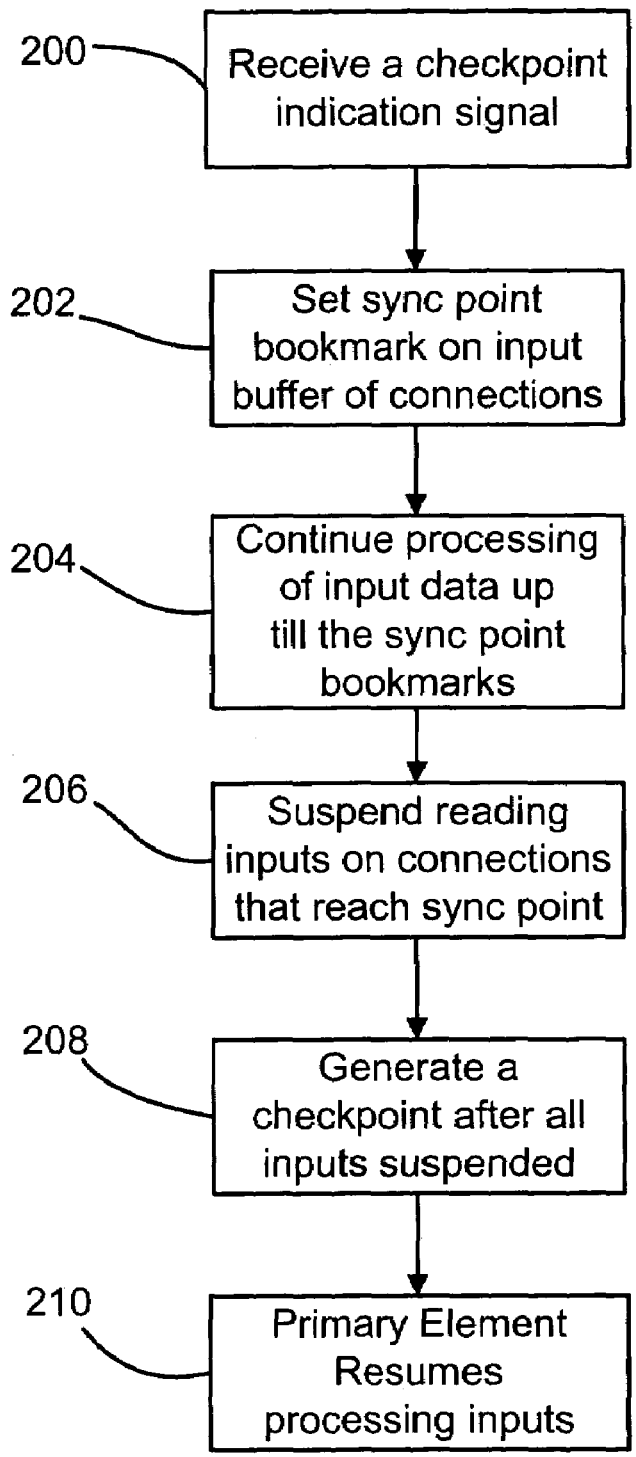
FIG. 2 is a flow chart illustrating an exemplary process for generating a checkpoint in accordance with the present invention.

Referring to FIG. 2, there is shown a flow chart illustrating an exemplary process for generating a checkpoint in accordance with the present invention. The process step may apply to both a primary element and a backup element unless noted otherwise.

At step 200, a checkpoint indication signal may be received by a network element. An arrival time of the checkpoint indication signal may be identified for use in subsequent steps.

At step 202, a sync point bookmark may be set on the input buffer of the element's network connections based on the arrival time of the checkpoint indication signal. This sync point bookmark may serve to separate the input signals that arrive, on each of the connections, after the checkpoint indication signal from those arriving before the checkpoint indication signal.

At step 204, the network element may continue processing of input data until the sync point bookmarks are reached. As the payload application executes on the network element, it may read input data off each connection using an application programming interface (API). When the API reaches the sync point bookmark on a connection, it may return a sync point indication to the payload application. As can be appreciated by those skilled in the art, step 204 may take place at the same time as steps 200 and 202.

At step 206, when the payload application receives the sync point indication on a connection, it may suspend reading input data from that connection. The subsequently arriving data may be kept in a input buffer or a similar storage device for later use.

At step 208, once the payload application reaches the sync point on all of its connections, it may generate a checkpoint representing its current state. For example, the checkpoint may contain data associated with the internal states and/or connection states of the network element.

At step 210, after a primary element generates its checkpoint, it may resume reading and processing its input data. The buffered input data may now be read and processed as the primary element resumes its normal operation.

According to one embodiment of the present invention, the payload application running on the redundant network elements may be divided into a number of independent sessions. Each session may generate its own checkpoint in a similar manner as the payload application. Thus, each independent session on the primary element may synchronize with its corresponding sessions on the backup elements by sending checkpoints for comparison.

Figure 3:
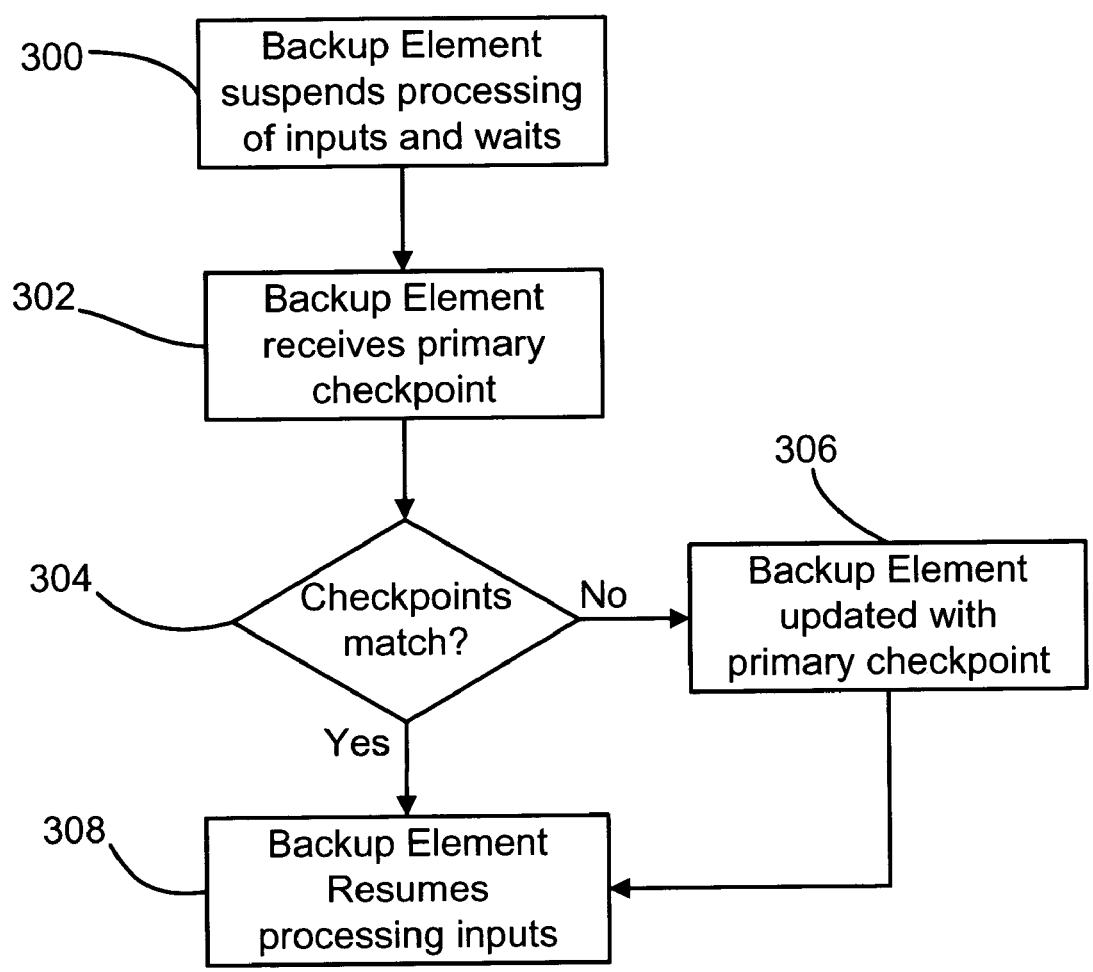
FIG. 3 is a flow chart illustrating a process for synchronizing a backup element in accordance with one embodiment of the present invention.
Figure 4:
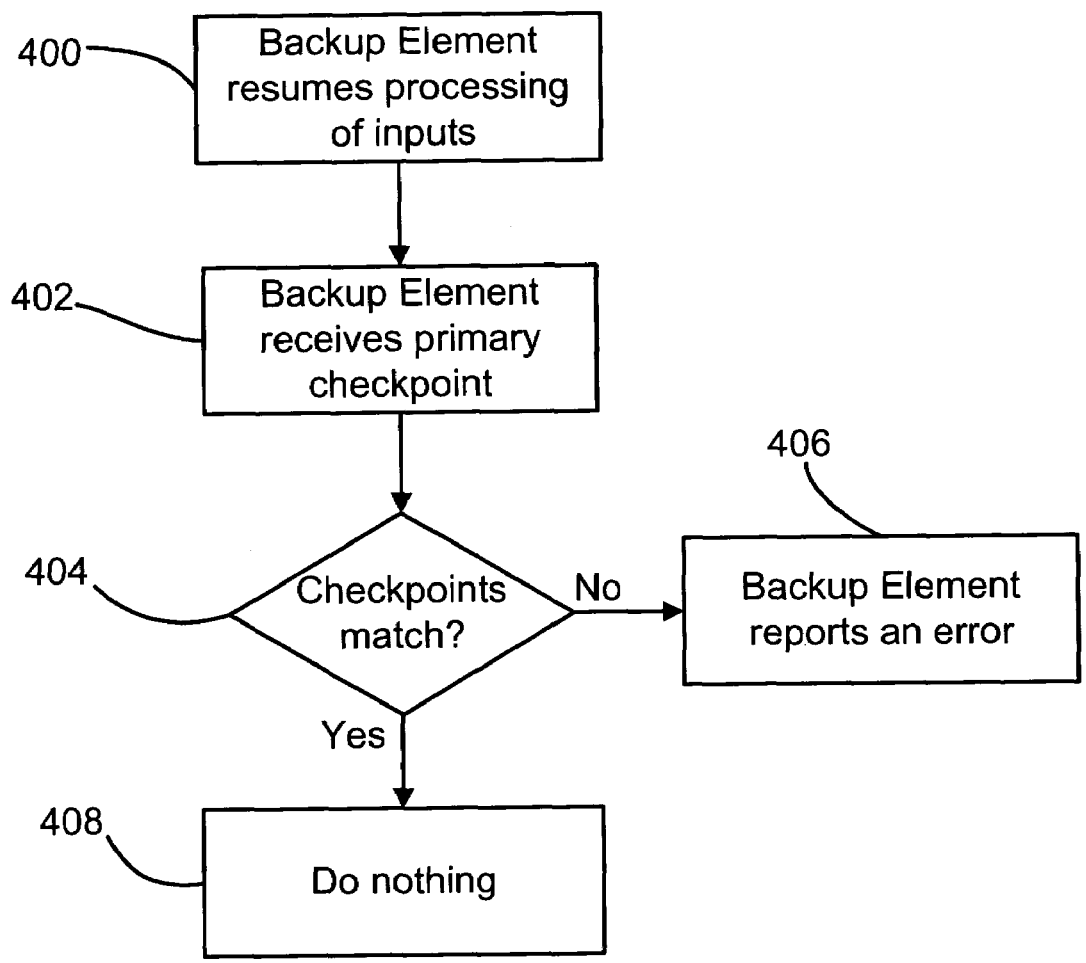
FIG. 4 is a flow chart illustrating a process for synchronizing a backup element in accordance with another embodiment of the present invention.

As mentioned earlier, the system may be so configured that the backup element may take different actions after it generates its checkpoint. FIGS. 3 and 4 introduce two options to configure the backup element.

Referring to FIG. 3, there is shown a flow chart illustrating a process for synchronizing a backup element in accordance with one embodiment of the present invention.

As shown in step 300, the backup element may be programmed to suspend processing of all inputs on its connections immediately after the sync point bookmarks have been reached on these connections. The input data arriving at the network connections of the backup element will not be discarded. Instead, they may be stored, in the order of their arrivals, in an input buffer or a similar storage device. After generation of the backup checkpoint, the backup element may wait for the primary checkpoint to arrive.

At step 302, the backup element may receive the primary checkpoint that has been generated and transmitted by the primary element.

At step 304 the backup checkpoint may be compared with the primary checkpoint. The information associated with the primary element's state that has been recorded in the primary checkpoint may be extracted and compared with the backup element's state recorded in the backup checkpoint. The comparison may be performed based on a plurality of predetermined criteria. For example, certain global state values from either checkpoint need to be identical in order to declare a match. On the other hand, certain local or node-specific values may not have to be the same. Depending on the information being compared, a partial or substantial match may be sufficient for synchronization purposes while on certain occasions an exact match may be more desirable.

If it is determined that the backup checkpoint does not match the primary checkpoint, then at step 306, the backup element may be updated with the primary checkpoint. That is, the state of the backup element may be overwritten based on the state information recorded in the primary checkpoint. Thus, a synchronization between the backup element and the primary element may be restored.

If it is determined that the backup checkpoint does match the primary checkpoint, then the backup element has been in synchronization with the primary element.

At step 308, the backup element may resume processing inputs that have been buffered since the generation of the backup checkpoint. After a short period of time, the backup element may catch up with the primary element and run in synchronization with it.

Referring to FIG. 4, there is shown a flow chart illustrating a process for synchronizing a backup element in accordance with another embodiment of the present invention.

As shown at step 400, the backup element may be programmed to resume processing of all inputs on its connections immediately after the backup checkpoint has been generated.

At step 402, the backup element may receive the primary checkpoint that has been generated and transmitted by the primary element.

At step 404, the backup checkpoint may be compared with the primary checkpoint. A match between these two checkpoints may indicate that the backup element has been running in synchronization with the primary element. Therefore, at step 408, the backup element does not have to do anything further.

If, however, that the backup checkpoint does not match the primary checkpoint, then at step 406, the backup element may report an error. Since the backup element has been processing inputs after the generation of its checkpoint, it may not be able to bring itself back into synchronization with the primary element based on the primary checkpoint. According to one embodiment of the present invention, the error signal sent by the backup element may be used to trigger a synchronization restoration process, where another primary checkpoint may be requested while the backup element is put on hold.

Other variations for the backup element's actions after checkpoint generation or comparison also exist.

Figure 5:
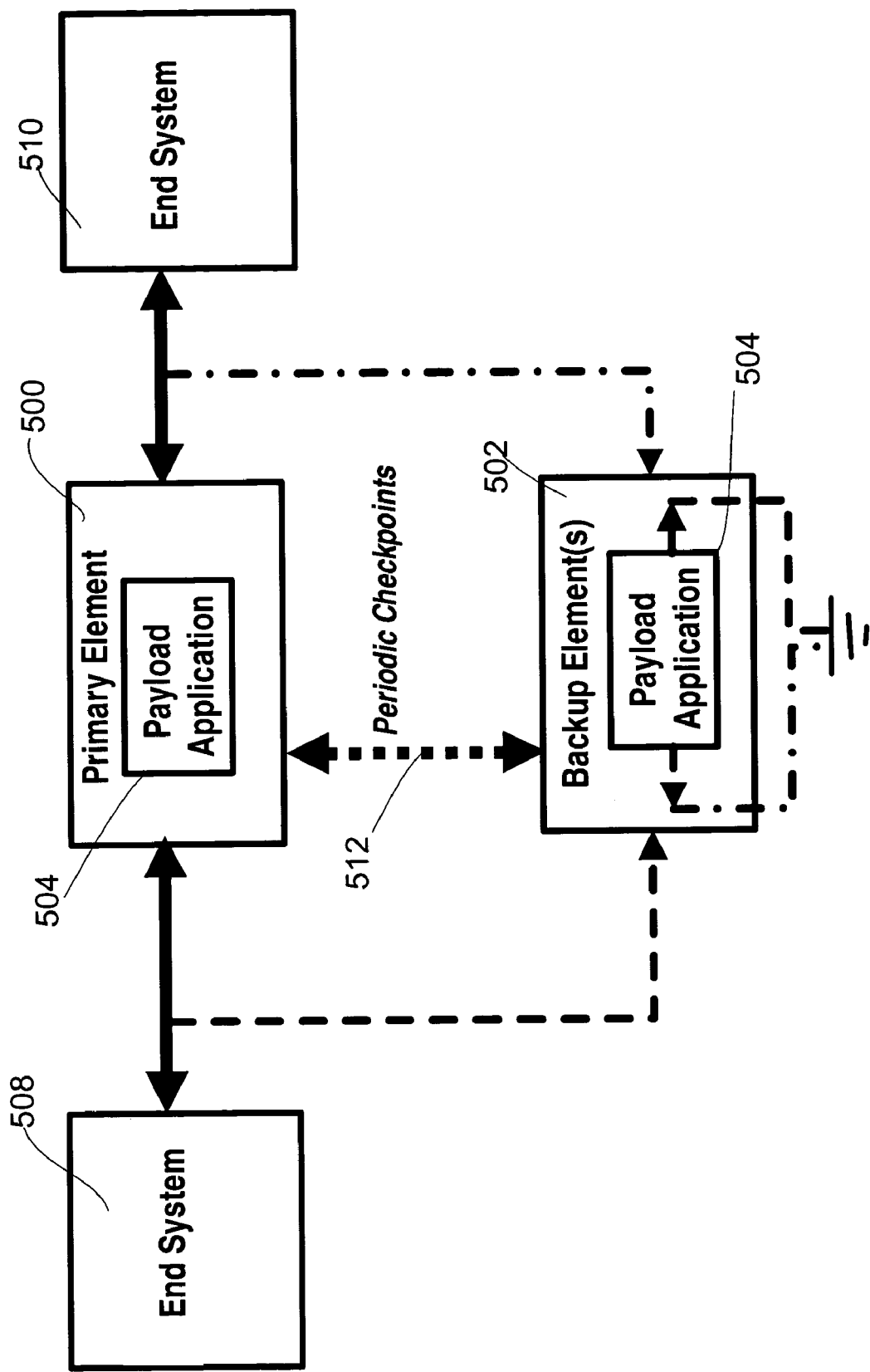
FIG. 5 is a block diagram illustrating an exemplary system for synchronizing redundant network elements in accordance with the present invention.

Referring now to FIG. 5, there is shown a block diagram illustrating an exemplary system for synchronizing redundant network elements in accordance with the present invention.

The exemplary system comprises a Primary Element 500 and Backup Element(s) 502, which are part of a network (partially shown) between End System 508 and End System 510. Backup Element(s) 502 may be physically redundant of Primary Element 500 and may run the same Payload Application 504 as Primary Element 500. The outputs of Primary Element 500 may be enabled while the outputs of Backup Element(s) 502 may be suppressed (shown as grounded) during normal operation. Connection 512 symbolizes the periodic checkpoints that Primary Element 500 may generate and transmit to Backup Element(s) 502 in accordance with one embodiment of the present invention.

At this point it should be noted that the system and method in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with synchronizing redundant network elements in accordance with the present invention as described above. Alternatively, one or more processors operating in accordance with stored instructions may implement the functions associated with synchronizing redundant network elements in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for synchronizing redundant network elements, the method comprising:

transmitting a checkpoint indication signal simultaneously to a primary element and at least one backup element, wherein each of the primary element and the at least one backup element has one or more connections to a network;

generating a first checkpoint that is indicative of a first status of the primary element associated with a first arrival time of the checkpoint indication signal at the primary element;

generating a second checkpoint that is indicative of a second status of the at least one backup element associated with a second arrival time of the checkpoint indication signal at the at least one backup element; and comparing the first checkpoint and the second checkpoint to determine a synchronization between the primary element and the at least one backup element.

2. The method according to claim 1, wherein the checkpoint indication signal is transmitted from the primary element, the at least one backup element or a source outside the network.

3. The method according to claim 1, wherein the step of generating a first checkpoint further comprises the steps of:

identifying a first arrival time of the checkpoint indication signal at the primary element;

finishing processing of any data arriving at the primary element before the first arrival time of the checkpoint indication signal;

suspending processing of a plurality of data arriving at the primary element after the first arrival time of the checkpoint indication signal;

generating a first checkpoint that is indicative of the status of the primary element in suspension;

transmitting the first checkpoint to the at least one backup element; and resuming processing of the plurality of data arriving at the primary element after the first arrival time of the checkpoint indication signal.

4. The method according to claim 1, wherein the step of generating a second checkpoint further comprises the steps of:

identifying a second arrival time of the checkpoint indication signal at the at least one backup element;

finishing processing of any data arriving at the at least one backup element before the second arrival time of the checkpoint indication signal;

suspending processing of a plurality of data arriving at the at least one backup element after the second arrival time of the checkpoint indication signal; and generating a second checkpoint that is indicative of the status of the at least one backup element in suspension.

5. The method according to claim 4 further comprising the steps of:

keeping the at least one backup element in suspension after generation of the second checkpoint;

comparing the second checkpoint with the transmitted first checkpoint;

updating the at least one backup element based on the transmitted first checkpoint if the second checkpoint does not match the transmitted first checkpoint based on a predetermined set of criteria; and taking the at least one backup element out of suspension.

6. The method according to claim 4 further comprising the steps of:

taking the at least one backup element out of suspension after generation of the second checkpoint;

comparing the second checkpoint with the transmitted first checkpoint; and reporting an error if the second checkpoint does not match the transmitted first checkpoint based on a predetermined set of criteria.

7. At least one processor readable storage medium for storing a computer program of instructions configured to be readable by at least one processor for instructing the at least one processor to execute a computer process for performing the method as recited in claim 1.

8. A system for synchronizing redundant network elements, the system comprising:

means for transmitting a checkpoint indication signal simultaneously to a primary element and at least one backup element, wherein each of the primary element and the at least one backup element has one or more connections to a network;

means for generating a first checkpoint that is indicative of a first status of the primary element associated with a first arrival time of the checkpoint indication signal at the primary element;

means for generating a second checkpoint that is indicative of a second status of the at least one backup element associated with a second arrival time of the checkpoint indication signal at the at least one backup element; and means for comparing the first checkpoint and the second checkpoint to determine a synchronization between the primary element and the at least one backup element.

9. A method for synchronizing redundant network elements, the method comprising:

receiving at a backup element a checkpoint indication signal;

generating a first checkpoint that is indicative of a status of the backup element associated with an arrival time of the checkpoint indication signal at the backup element;

receiving a second checkpoint from a primary element that is indicative of a status of the primary element associated with an arrival time of the checkpoint indication signal; and comparing the first checkpoint and the second checkpoint to determine a synchronization between the primary element and the backup element;

wherein the checkpoint indication signal is transmitted simultaneously to the primary element and the backup element.

10. A system for synchronizing redundant network elements, the system comprising:

means for receiving at a backup element a checkpoint indication signal;

means for generating a first checkpoint that is indicative of a status of the backup element associated with an arrival time of the checkpoint indication signal at the backup element;

means for receiving a second checkpoint from a primary element that is indicative of a status of the primary element associated with an arrival time of the checkpoint indication signal; and means for comparing the first checkpoint and the second checkpoint to determine a synchronization between the primary element and the backup element;

wherein the checkpoint indication signal is transmitted simultaneously to the primary element and the backup element.

11. The method according to claim 1, wherein the checkpoint indication signal is positioned similarly relative to other signals arriving for processing at the primary element and the at least one backup element.

12. The system according to claim 8, wherein the checkpoint indication signal is positioned similarly relative to other signals arriving for processing at the primary element and the at least one backup element.

13. The method according to claim 9, wherein the checkpoint indication signal is positioned similarly relative to other signals arriving for processing at the primary element and the at least one backup element.

14. The system according to claim 10, wherein the checkpoint indication signal is positioned similarly relative to other signals arriving for processing at the primary element and the at least one backup element.

15. The method according to claim 1, wherein the step of generating a first checkpoint comprises generating a plurality of first checkpoints that are indicative of a first status of a respective plurality of sessions on the primary element associated with a first arrival time of the checkpoint indication signal at the primary element, wherein the step of generating a second checkpoint comprises generating a plurality of second checkpoints that are indicative of a second status of a respective plurality of sessions on the at least one backup element associated with a second arrival time of the checkpoint indication signal at the at least one backup element, and wherein the step of comparing the first checkpoint and the second checkpoint comprises comparing the plurality of first checkpoints and the plurality of second checkpoints to determine a synchronization between the primary element and the backup element.

16. The system according to claim 8, wherein the means for generating a first checkpoint comprises means for generating a plurality of first checkpoints that are indicative of a first status of a respective plurality of sessions on the primary element associated with a first arrival time of the checkpoint indication signal at the primary element, wherein the means for generating a second checkpoint comprises means for generating a plurality of second checkpoints that are indicative of a second status of a respective plurality of sessions on the at least one backup element associated with a second arrival time of the checkpoint indication signal at the at least one backup element, and wherein the means for comparing the first checkpoint and the second checkpoint comprises means for comparing the plurality of first checkpoints and the plurality of second checkpoints to determine a synchronization between the primary element and the backup element.

17. The method according to claim 9, wherein the step of generating a first checkpoint comprises generating a plurality of first checkpoints that are indicative of a status of a respective plurality of sessions on the backup element associated with an arrival time of the checkpoint indication signal at the backup element.

18. The system according to claim 10, wherein the means for generating a first checkpoint comprises means for generating a plurality of first checkpoints that are indicative of a status of a respective plurality of sessions on the backup element associated with an arrival time of the checkpoint indication signal at the backup element.

19. The method according to claim 1, further comprising:

generating the checkpoint indication signal periodically.

* * * * *